US010359251B2

(12) United States Patent
Benson et al.

(10) Patent No.: US 10,359,251 B2
(45) Date of Patent: Jul. 23, 2019

(54) RETRACTABLE GUN BORE CLEANING SYSTEM

(71) Applicant: Birchwood Casey, LLC, Eden Prairie, MN (US)

(72) Inventors: Jess Reggie Benson, Burnsville, MN (US); Raymond Floyd Tolliver, East Bethel, MN (US); Scott Benjamin Johnson, Minneapolis, MN (US)

(73) Assignee: Birchwood Casey, LLC, Eden Prairie, MN (US)

( * ) Notice: Subject to any disclaimer, the term of this patent is extended or adjusted under 35 U.S.C. 154(b) by 0 days.

(21) Appl. No.: 16/136,803

(22) Filed: Sep. 20, 2018

(65) Prior Publication Data

US 2019/0086179 A1 Mar. 21, 2019

Related U.S. Application Data

(60) Provisional application No. 62/560,873, filed on Sep. 20, 2017.

(51) Int. Cl.
  *F41A 29/02* (2006.01)
  *B65H 75/44* (2006.01)
  *F16B 45/02* (2006.01)
  *B65H 75/48* (2006.01)

(52) U.S. Cl.
  CPC .......... *F41A 29/02* (2013.01); *B65H 75/4431* (2013.01); *B65H 75/4471* (2013.01); *B65H 75/486* (2013.01); *F16B 45/02* (2013.01)

(58) Field of Classification Search
  CPC ................... F41A 29/02; F41A 29/00
  USPC ............................................. 42/95
  See application file for complete search history.

(56) References Cited

U.S. PATENT DOCUMENTS

| | | | | |
|---|---|---|---|---|
| 336,292 A | * | 2/1886 | Clark et al. | F41A 29/02 15/104.16 |
| 345,818 A | * | 7/1886 | Upham | B08B 9/0436 15/104.18 |
| 621,857 A | * | 3/1899 | Scott | F41A 29/02 15/104.165 |
| 852,748 A | * | 5/1907 | True | F41A 29/02 15/104.165 |
| 860,180 A | * | 7/1907 | Aird | F41A 29/02 15/104.16 |

(Continued)

*Primary Examiner* — Joshua E Freeman
(74) *Attorney, Agent, or Firm* — Pauly, DeVries Smith & Deffner LLC

(57) ABSTRACT

A gun cleaning system and method is disclosed. The system includes a housing with a retractor. A tether is coupled with the retractor. A connector hoop is disposed at one end of the tether. A cleaning attachment separate from the housing and the tether is configured to detachably couple with the tether. The cleaning attachment has a coupling recess with an opening providing access to the recess. Inserting the tether's connector hoop into the recess couples the tether and the cleaning attachment. A catch adjacent to the opening prevents the connector hoop from exiting the recess. A method of cleaning a gun bore includes passing the tether through the bore, attaching a cleaning patch to the cleaning attachment, coupling the cleaning attachment and the connector hoop, and pulling the tether and the cleaning hoop member back through the bore in the opposite direction. Other embodiments are also included herein.

19 Claims, 5 Drawing Sheets

(56) References Cited

U.S. PATENT DOCUMENTS

| | | | | |
|---|---|---|---|---|
| 882,598 A * | 3/1908 | Ward | ................ | F41A 29/02 |
| | | | | 15/104.066 |
| 1,004,710 A * | 10/1911 | Swazey | ................ | F41A 29/02 |
| | | | | 15/104.05 |
| 2,749,565 A * | 6/1956 | Stamm, Jr. | ................ | F41A 29/02 |
| | | | | 15/104.165 |
| 2,800,289 A * | 7/1957 | Stamm, Jr. | ................ | F41A 29/02 |
| | | | | 15/104.16 |
| 3,398,417 A * | 8/1968 | Erwin | ................ | F41A 29/02 |
| | | | | 15/104.19 |
| 3,895,764 A * | 7/1975 | Roland | ................ | A61G 15/16 |
| | | | | 242/378.2 |
| 4,895,336 A * | 1/1990 | Lieberman | ................ | B25H 3/006 |
| | | | | 248/328 |
| 5,074,074 A | 12/1991 | Yeadon | | |
| 5,171,925 A | 12/1992 | Mekler | | |
| 5,422,957 A | 6/1995 | Cummins | | |
| 5,588,242 A * | 12/1996 | Hughes | ................ | F41A 29/02 |
| | | | | 15/104.066 |
| 5,762,281 A | 6/1998 | Foley | | |
| 5,934,000 A | 8/1999 | Hayes, Sr. | | |
| 6,616,080 B1 | 9/2003 | Edwards et al. | | |
| 6,630,034 B1 | 10/2003 | Schnell | | |
| 6,736,346 B1 * | 5/2004 | Park | ................ | B65H 75/4434 |
| | | | | 242/378.1 |
| 7,017,846 B2 | 3/2006 | Tsoi et al. | | |
| 7,356,961 B2 | 4/2008 | Williams | | |
| 7,374,123 B2 | 5/2008 | Han | | |
| 9,115,945 B2 | 8/2015 | Williams et al. | | |
| 9,200,861 B1 * | 12/2015 | Kim | ................ | B08B 9/049 |
| 9,526,674 B2 | 12/2016 | Heyns et al. | | |
| 9,718,640 B2 * | 8/2017 | Burner | ................ | G09F 21/02 |
| 9,815,320 B2 * | 11/2017 | Khangar | ................ | B44D 3/38 |
| 9,964,378 B1 * | 5/2018 | Williams | ................ | F41A 29/02 |
| 10,139,185 B2 * | 11/2018 | Jacobson | ................ | F41A 29/02 |
| 2003/0106714 A1 | 6/2003 | Smith et al. | | |
| 2004/0111948 A1 * | 6/2004 | Schnell | ................ | F41A 29/02 |
| | | | | 42/95 |
| 2006/0236584 A1 * | 10/2006 | Williams | ................ | F41A 29/02 |
| | | | | 42/95 |
| 2007/0251786 A1 * | 11/2007 | Wegner | ................ | B65H 75/28 |
| | | | | 191/12.2 R |
| 2008/0035778 A1 * | 2/2008 | Belden | ................ | A45F 5/004 |
| | | | | 242/375 |
| 2008/0061052 A1 | 3/2008 | Roettinger et al. | | |
| 2009/0178324 A1 * | 7/2009 | Hopper | ................ | F41A 29/02 |
| | | | | 42/90 |
| 2011/0099880 A1 * | 5/2011 | Stephens | ................ | F41A 29/02 |
| | | | | 42/95 |
| 2012/0180816 A1 * | 7/2012 | Shipman | ................ | F41A 29/02 |
| | | | | 134/8 |
| 2014/0082989 A1 * | 3/2014 | Canham | ................ | F41A 29/02 |
| | | | | 42/95 |
| 2015/0153129 A1 * | 6/2015 | Marvin | ................ | F41A 29/02 |
| | | | | 42/95 |
| 2015/0176939 A1 * | 6/2015 | Thalmann | ................ | F41A 29/00 |
| | | | | 42/95 |
| 2015/0285578 A1 * | 10/2015 | Hwang | ................ | F41A 29/02 |
| | | | | 42/95 |
| 2015/0308686 A1 * | 10/2015 | Hensley | ................ | F23Q 1/06 |
| | | | | 42/90 |
| 2017/0146313 A1 | 5/2017 | Briody et al. | | |
| 2018/0172386 A1 * | 6/2018 | Jacobson | ................ | F41A 29/02 |

\* cited by examiner

RETRACTABLE GUN BORE CLEANING SYSTEM

This application claims the benefit of U.S. Provisional Application No. 62/560,873, filed Sep. 20, 2017, the content of which is herein incorporated by reference in its entirety.

FIELD

Embodiments herein relate to systems and methods for cleaning a gun bore. More specifically, embodiments herein relate to a retractable, pull-through gun cleaning system.

BACKGROUND

Firearm bores require regular cleaning. One method of cleaning is to put a cleaning solvent or solution on an absorbent piece of cloth, also called a patch, and pull the cloth through the bore of the gun barrel using a long rod. Care must be taken when cleaning the bore. Letting a cleaning rod touch the inside of the bore can cause damage such as scratches. Damage to the muzzle or crown of the gun barrel can cause a loss of accuracy. Therefore, many authorities suggest that a gun barrel should only be cleaned by pulling the patch from the chamber of the barrel toward the muzzle. Likewise, it is common practice to only insert cleaning rods into the chamber of the gun barrel and not the muzzle.

SUMMARY

Embodiments herein relate to a retractable, pull-through gun cleaning system. In an embodiment, a gun cleaning system is included having a housing defining an aperture and an interior volume. A retractor can be disposed in the interior volume of the housing. A tether can pass through the aperture of the housing. The tether can include a first end connected to the retractor, a second end opposite the first end, and a connection hoop connected to the second end of the tether. The system can include a cleaning attachment configured to be detachably connected to the connection hoop. The cleaning attachment can include a coupling recess, an opening providing access to the coupling recess, a first catch adjacent to the opening, and an aperture configured to receive a cleaning patch. The opening of the cleaning attachment can be configured to receive the connection hoop into the coupling recess. The first catch can be configured to prevent the connection hoop from exiting the coupling recess.

In an embodiment, a method for cleaning a gun barrel is included herein. The method can include pulling a tether out from a housing, the housing defining an aperture and an interior volume. The tether can pass through the aperture of the housing, the tether can include a first end connected to a retractor disposed within the interior volume, a second end opposite the first end, and a connection hoop disposed at the second end of the tether. The method can include inserting the connection hoop into a muzzle of the gun barrel, passing the connection hoop through the gun barrel to exit a chamber of the gun barrel, inserting the connection hoop into an opening of a cleaning attachment. The cleaning attachment can include a coupling recess. The opening can provide access to the coupling recess. The cleaning attachment can also include a catch adjacent to the opening and an aperture configured to receive a cleaning patch. The method can further include pulling the tether and the cleaning attachment through the gun barrel to exit the muzzle of the gun barrel.

In an embodiment, a gun cleaning system is included. The system can include a housing having a retractor, a cleaning attachment comprising a coupling recess and a tether. The tether can have a first end coupled to the retractor and a connection hoop at a second end of the tether opposite the first end. The connection hoop can be configured to releasably couple with the coupling recess.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

Embodiments herein include a system for cleaning a bore of a gun barrel is provided. The system includes a retractable tether with a connection hoop, a housing into which the tether retracts, and a cleaning attachment with a recess configured to releasably couple with the connection hoop. The system allows for convenient adjustment of the tether to the desired length for cleaning along with retraction for easy storage after cleaning is done.

Figure 1:
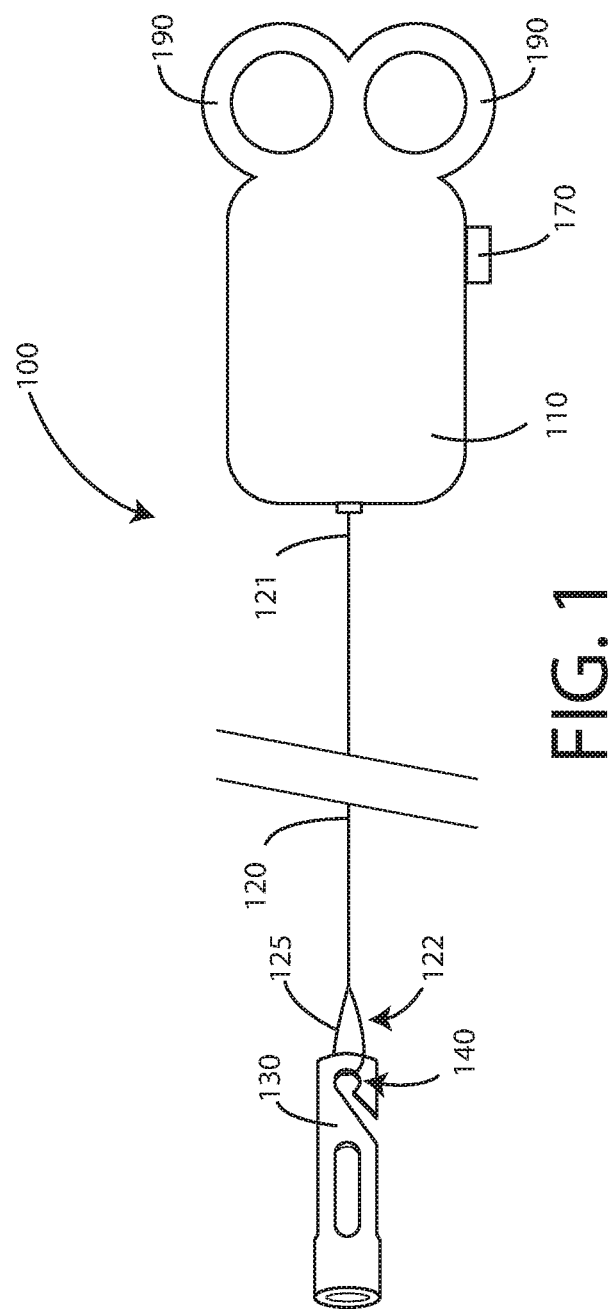
FIG. 1 is a schematic view of a gun cleaning system according to some examples.

FIG. 1 is a schematic view of the gun cleaning system according to some examples. As shown in FIG. 1, the gun cleaning system 100 includes a tether 120 and a cleaning attachment 130. The cleaning attachment 130 is configured to receive a patch cloth for cleaning the bore of a gun barrel. The tether 120 is configured to releasably couple with the cleaning attachment 130. In various embodiments, the tether 120 has a connection hoop 125 at a second end 122 of the tether 120. The cleaning attachment 130 has a recess 140 in the body of the cleaning attachment 130. The recess 140 is configured to receive the connection hoop 125 of the tether 120 and retain the connection hoop 125 while the cleaning attachment 130 is being pulled through the bore of a gun barrel.

Retention of the connection hoop 125 by the recess 140 is sufficient so as to prevent the connection hoop 125 from accidentally slipping out of the recess 140 if there is slack in the tether 120 such as if the user moves the housing 110 back toward the gun barrel. This acts as a safety mechanism because if the connection hoop 125 were to accidentally disengage from the recess 140 of the cleaning attachment 130 while the cleaning attachment 130 is within the bore of the gun, then the cleaning attachment 130 could become stuck within the bore. As such, one or more features can be included to prevent accidental disengagement of the connection hoop 125 from the recess 140 of the cleaning attachment 130.

The tether 120 is retractably housed inside a housing 110. A second end 122 of the tether 120 is attached inside of the housing 110. The tether 120 can be reversibly spooled within the housing 110. The tether 120 can pass through an aperture in the housing 110 to exit the housing 110. A retractor or retraction mechanism according to some examples will be described more fully in relation to FIG. 4. The tether 120 has a length that is at least as long as the length of a gun barrel bore to be cleaned. For example, the tether 120 can have a length of approximately 12, 16, 20, 24, 28, 32, 36, 40, or 44 inches. In some embodiments, the tether can have a length falling within a range wherein the upper and lower bound of the range can be selected from any of the preceding lengths.

The cleaning system 100 functions by pulling the tether 120 outside of the retractor housing 110, inserting the tether 120 into one side of a bore of a gun barrel and out the other side of the bore, attaching the connection hoop 125 to the recess 140 of the cleaning attachment 130, attaching a cloth patch to the cleaning attachment 130, and pulling the tether 120 back through the bore in the opposite direction. In some examples, pulling the tether 120 through the bore includes actuating the retractor inside of the housing to cause the tether 120 to be pulled through the bore and into the housing 110. In other embodiments, the length of the tether 120 can be fixed by locking the retraction mechanism and then the tether 120 can be pulled through the bore by the exertion of a user pulling on the handles 190 attached to the housing 110. The method of cleaning will be described more fully in relation to FIG. 5.

In some examples, a retractor (or actuator) button 170 is provided. The retractor button 170 can take on various forms including a push button, a slide button, a rocker button, or the like. The retractor button 170 can have various functions. In some embodiments, the retractor button 170 can be used to actuate the retraction mechanism inside of the housing 110. In some embodiments, when the retractor button 170 is depressed or slid to a specific position, the tether 120 can be both withdrawn from the housing 110 if pulled or retracted into the housing 110 if the user is not pulling on the tether 120. In some embodiments, when the retractor button 170 is not depressed or slid to a specific position, the retraction mechanism is effectively locked so that the tether 120 cannot be withdrawn from the housing 110 or retracted back into the housing 110. Many options for functionality are contemplated herein.

In some examples, the housing 110 includes one or more handles 190. The handles 190 provide grip to the user while pulling the tether 120 out of the housing 110 and/or while pulling the tether 120 through the bore of a gun to be cleaned. In some examples, a single handle is provided. In other examples, two handles are provided. The handles 190 may be sized to receive a user's finger, allowing the user to slide the handles 190 over the fingers to provide grip. In alternative examples, the handles may include grooves, textured surfaces providing friction grip, or may being made of high-friction materials to provide grip.

Figure 2:
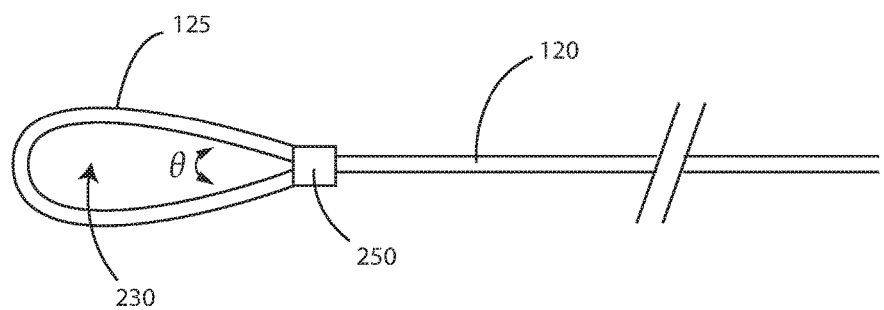
FIG. 2 is a schematic side view of a tether of FIG. 1.

FIG. 2 is a side view of the tether 120 of FIG. 1. The tether 120 has a connection hoop 125 at an end of the tether 120. The connection hoop 125 is configured to releasably couple with the recess 140 of the cleaning attachment 130. The connection hoop 125 defines an opening 230 that is inserted into the recess 140 to couple the cleaning attachment 130 to the tether 120. In some examples, the connection hoop 125 is a looped end of the tether 120. In some examples, a ferrule 250 is placed at the base of the connection hoop 125 to retain the end of the tether 120 in the looped configuration. In other examples, the ferrule 250 can be omitted. In some examples, the connection hoop 125 is integrally formed from the tether 120. Alternatively, the connection hoop 125 can be a separate structure that is connected to the end of the tether 120 by the ferrule 250.

In some embodiments, the overall circumference of the connection hoop is fixed. In other embodiments, the circumference of the connection hoop can be changed, such as be a user cinching the connection hoop to make it smaller. In some embodiments, the ferrule 250 (or a similar structure in that position) can be fixed to one side of the connection hoop 125 but slidingly engage the other side of the connection hoop 125 in order to facilitate making the connection hoop bigger or smaller as desired. In some embodiments, the ferrule 250 can be replaced with a small loop formed at one end of the connection hoop in the same area as where the ferrule 250 is shown in order to form a connection hoop that can be made bigger or smaller as desired.

In some examples, the connection hoop 125 is configured to hold its shape during use. In this case, the opening 230 defines a V-shaped opening angle $\theta$ that characterizes the separation of the sides of the connection hoop 125. The value of $\theta$ can vary based on many aspects including the overall size of the connection hoop 125 and the size of the recess 140. In some examples, $\theta$ is at least 5°, 10°, 15°, 20°, 30°, 40°, 50°, 60°, 70°, 80°, 90°, 100°, 120°, 140°, 160°, or 180°. In some examples, $\theta$ falls within a range, wherein the upper and lower bound of the range can be any of the foregoing angles.

The ability of the connection hoop 125 to hold its shape allows the connection hoop 125 to easily be inserted into the recess 140 of the cleaning attachment 130. This is done by maneuvering the tether into a position in which the end of the connection hoop 125 is aligned with the opening of the recess 140, then slipping the connection hoop 125 into the recess 140. In alternative examples, the connection hoop 125 can be elliptical or circular. In other examples, the connection hoop 125 is not configured to hold its shape permanently.

Figure 3:
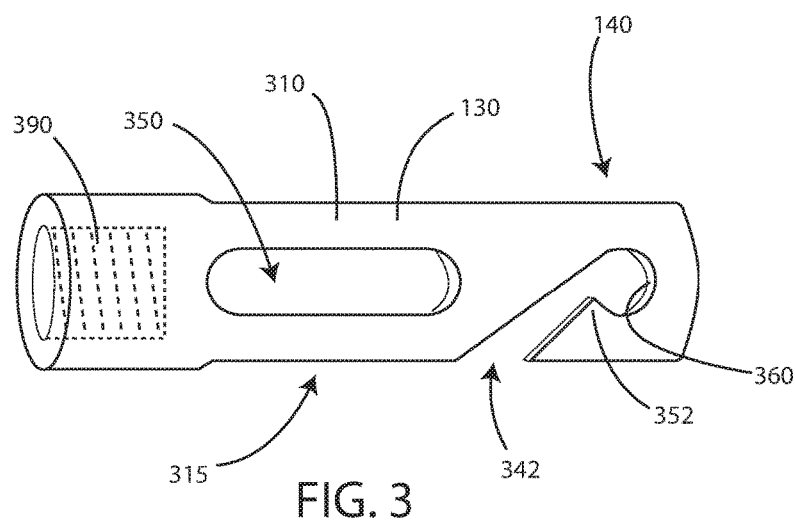
FIG. 3 is a schematic side view of a cleaning attachment of FIG. 1.

FIG. 3 is a side view of the cleaning attachment 130 of FIG. 1. The cleaning attachment 130 has an elongated body 310 with an aperture 350 configured to receive a patch cloth. The cleaning attachment 130 includes the recess 140 that is configured to detachably connect the cleaning attachment 130 to the connection hoop 125. The elongated body 310 has a first side edge 315. An opening 342 in the first side edge 315 of the cleaning attachment 130 provides access to the interior of the recess 140. The opening 342 receives the connection hoop 125, which then passes into the recess 140. A catch 352 adjacent to the opening 342 traps the connection hoop 125 in the recess 140 when the connection hoop 125 is inserted through the opening 342 into the recess 140.

In the example of FIG. 3, the catch 352 is a lip section of the opening 342 that creates a constriction at the mouth of the opening 342. However, the catch 352 can also take on various forms such as a bump, protrusion, peg, or the like. The catch 352 is configured to prevent the connection hoop 125 from exiting the recess 140. In this example, the catch 352 has a width that is less than a thickness of the connection hoop 125. Coupling the connection hoop 125 with the recess 140 therefore can include deforming the thickness of the connection hoop 125 under force so that it can fit into the opening 342. One way this can be accomplished is by compressing the thickness of the connection hoop 125 by forcibly sliding the connection hoop 125 through the opening 342, causing the thickness of the connection hoop 125 to deform. In some alternative examples, stretching the connection hoop 125 along its length causes the thickness of the connection hoop 125 to decrease, allowing the connection hoop 125 to slide through the opening 342.

In some embodiments, coupling the connection hoop 125 with the recess 140 can include applying enough force so that the material defining the opening 342 flexes to allow the connection hoop 125 to enter or exit the recess 140. In some embodiments, both the thickness of the connection hoop 125 can be deformed under force and the material defining the opening 342 can flex under force to allow the connection hoop 125 to enter or exit the recess 140.

While FIG. 3 shows a single catch 352, it will be appreciated that in some embodiments two catches can be used, such as one on either side of the opening 342. In addition, the catch 352 can take on many different other forms while still accomplishing the purpose of creating a narrowing to retain the connection hoop 125 within the recess 140.

In some examples, the size (or width to allow passage of the connection hoop there through) of the opening 342 is about 0.25 mm, 0.5 mm, 0.75 mm, 1 mm, 1.5 mm, 2.0 mm, 2.5 mm, 3.0 mm, or 4.0 mm. In some embodiments, the size of the opening can fall within a range wherein any of the foregoing widths can serve as the upper or lower bound of the range. In the area of the catch 352, the size of the opening 342 can be further constricted. In some embodiments, the size of the opening 342 at the catch 352 can be 0.1 mm, 0.15 mm, 0.2 mm, 0.25 mm, 0.5 mm, 0.75 mm, 1 mm, 1.5 mm, 2.0 mm, or 2.5 mm. In some embodiments, the size of the opening 342 at the catch 352 can fall within a range wherein any of the foregoing widths can serve as the upper or lower bound of the range. In some embodiments, the size of the opening 342 is greater at an exterior surface of the cleaning attachment 130 and then becomes gradually narrower as the opening 342 moves inward toward the center of the cleaning attachment 130 before it meets the catch 352 at which point it can become markedly narrower.

In some examples, the thickness of the connection hoop 125 is 0.25 mm, 0.5 mm, 0.75 mm, 1 mm, 1.5 mm, 2.0 mm, 2.5 mm, 3.0 mm, or 4.0 mm. In some embodiments, the thickness of the connection hoop can fall within a range wherein any of the foregoing thicknesses can serve as the upper or lower bound of the range.

Once the connection hoop 125 is situated inside of the recess 140, the catch 352 prevents the connection hoop 125 from exiting the recess 140 because the thickness of the connection hoop 125 is greater than the size of the opening 342 as constricted by the catch 352.

In some examples, the cleaning attachment 130 is constructed from a polymer material such as a polyolefin (including but not limited to polyethylene or polypropylene), a polyamide (including but not limited to NYLON), ABS polymer, or the like. In other examples, the cleaning attachment 130 is constructed from a relatively soft metal such as brass or aluminum. In some embodiments, the cleaning attachment 130 can be constructed of a composite material.

The cleaning attachment 130 can be constructed using any of several techniques, such as turning, stamping, or molding. The cleaning attachment 130 is sized proportionally to fit through a bore of a gun barrel. In some examples, the length of the cleaning attachment 130 (e.g., in the direction that is parallel to the bore of the gun when the cleaning attachment is pulled through the bore) is about 5 mm, 10 mm, 15 mm, 20 mm, 30 mm, 40 mm, 50 mm, or more. In some embodiments, the length of the cleaning attachment can fall within a range wherein any of the foregoing lengths can serve as the upper or lower bound of the range.

The cleaning attachment 130 has a width (e.g., perpendicular to the length) that can be 2 mm, 3 mm, 4 mm, 5 mm, 6 mm, 7 mm, 8 mm, 9 mm, 10 mm, 11 mm, or more. In some embodiments, the width of the cleaning attachment can fall within a range wherein any of the foregoing widths can serve as the upper or lower bound of the range.

In some examples, the recess 140 further comprises a seating point 360 that is configured to seat the tether 120 in the recess 140. In the example of FIG. 3, the seating point 360 is a concave forward portion of the recess 140. Other configurations are possible; for example, the seating point 360 could be replaced by a notch that is approximately the same size and shape as the cross-section of the tether 120. In some embodiments, the farthest forward (in the direction closest to the tether 120 when it is connected to the cleaning attachment 130) portion of the seating point 360 is located at a lateral midpoint of the cleaning attachment 130. In this manner, when force is exerted on the cleaning attachment 130 by the tether 120 as the cleaning attachment 130 is pulled through the bore, the cleaning attachment 130 is pulled straight forward as opposed to being twisted or canted by an off-center pulling force.

The cleaning attachment 130 can also include a threaded end 390 configured to receive accessory attachments, such as brushes and the like. In the example of FIG. 3, the threaded end 390 is a female threaded end. The threaded end can also be a male threaded end. The threaded end may be, for example, an 8/32 threaded screw.

Figure 4:
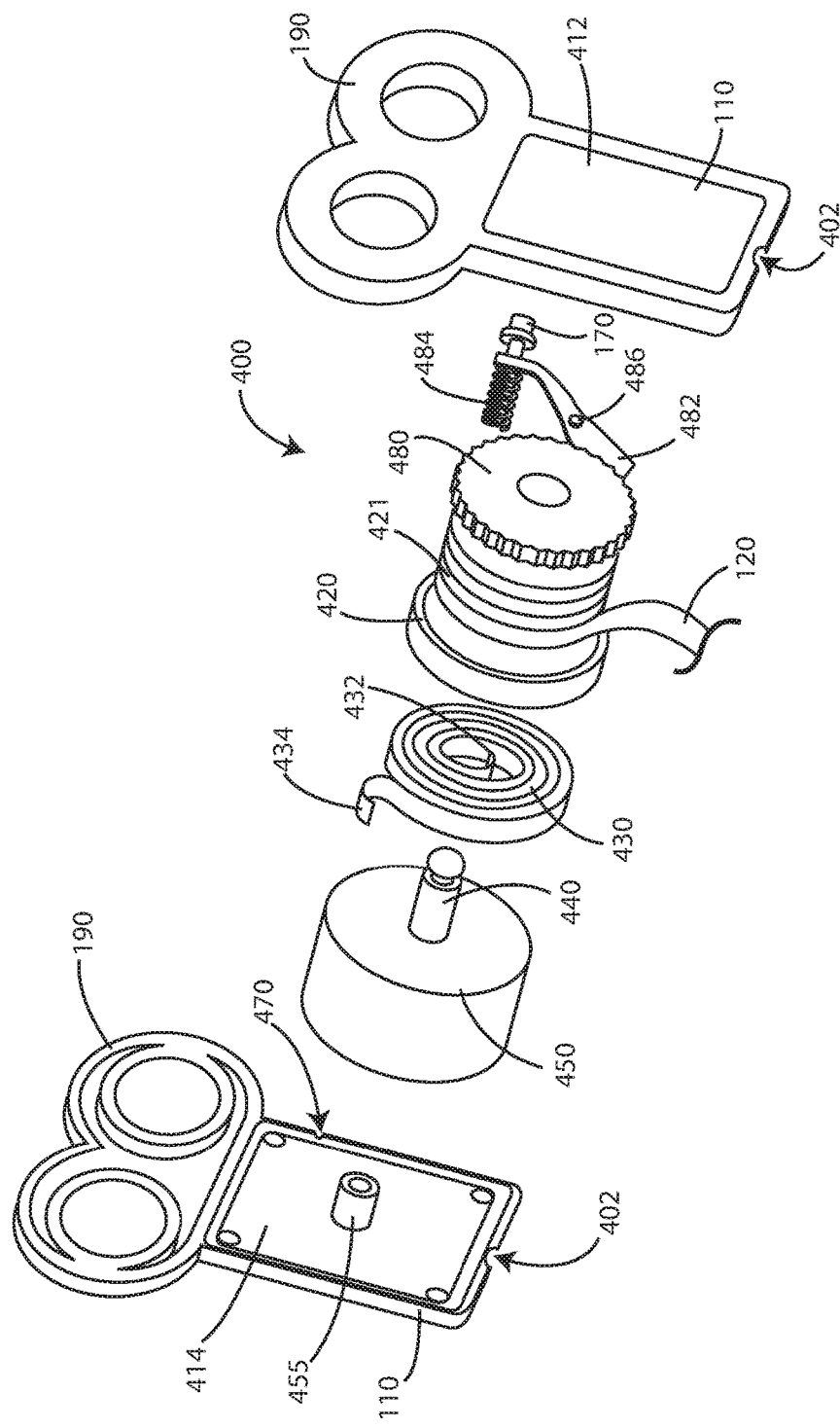
FIG. 4 is a schematic exploded view of a retraction mechanism according to some examples.

FIG. 4 is an exploded view of a retractor assembly 400 disposed inside the housing 110 according to some examples. The components shown in FIG. 4 are not drawn to scale. As described herein, a retractor assembly comprises multiple parts that collectively function to retract a tether 120 inside of the housing 110 and also permit the tether 122 be pulled outside of the housing 110; this assembly may also simply be called a retractor. Although FIG. 4 shows one particular implementation of a retraction mechanism, it should be understood that many variations of retractors exist and are contemplated herein. Retraction mechanisms are described in U.S. Pat. Nos. 2,800,289; 5,422,957; 5,762,281; 6,616,080; and 7,374,123, the content of which regarding retraction mechanisms is herein incorporated by reference in its entirety.

In the example of FIG. 4, the housing 110 comprises a first housing member 412 and a second housing member 414 defining an interior volume of the housing. At least one of the first housing member 412 and the second housing member 414 defines a first aperture 402. When the housing 110 and the retractor assembly 400 are fully assembled, the tether 120 passes through the first aperture 402, through which tether 120 can pass from the interior volume of the housing 110 to the exterior of the housing 110. In some examples, the first aperture 402 is situated at a midpoint of the housing 110 opposite the one or more handles 190. This configuration allows a user to grasp the handles 190 while pulling the tether 120 outside of the housing 110 with a force vector along a midline of the housing 110.

At least one of the first housing member 412 and the second housing member 414 also includes a second aperture 470 through which an actuator button 170 can pass to actuate the retraction mechanism. The retractor assembly 400 is configured to retract the tether 120 through the first aperture 402 and into the housing 110.

The retractor assembly 400 includes a disc 450 with a spindle 440. In some examples, the housing 110 includes a pin 455 for centering the disc in the interior of the housing 110. The retractor assembly 400 also includes a spring-loaded retraction spool 420. A spiral spring 430 is seated around the spindle 440, between the disc 450 and the retraction spool 420. The spiral spring 430 includes an interior coil end 432 and an exterior coil end 434. The interior coil end 432 is fixedly attached to the spindle 440 such that the interior coil and 432 does not rotate with respect to the disc 450. The exterior coil end 434 is rotationally attached to the retraction spool 420 such that when the retraction spool 420 rotates on the spindle 440, the spiral spring compresses rotationally, storing the kinetic energy of the rotation as potential energy. The spiral spring 430 can provide constant, linear resistance to rotation. In some examples, at least one half, one, two or three ounces of tension force is required to compress the spiral spring 430. In some examples, less than six, five, four or three ounces of tension force is required to compress the spiral spring 430. However, the tension force can be selected as desired.

In some examples, the retractor assembly 400 incorporates a ratchet and pawl mechanism that regulates the extension of the tether 120. The ratchet 480 can be integral to the retraction spool 420. When the retraction spool 420 rotates on the spindle, the ratchet 480 also rotates. In the example of FIG. 4, the pawl 482 includes a helical spring 484 that forces the pawl 482 into a normally seated position against a tooth along the edge of the ratchet 480. In this position, the pawl 482 allows the ratchet 480 to freely rotate in a clockwise direction, but prevents the ratchet 480 from rotating in a counterclockwise direction.

The pawl 482 is rotatable around an axis 486. The actuator button 170 is configured to cause the pawl 482 to rotate on the axis 486. Specifically, applying inward force to the actuator button 170 pushes the actuator button 170 against a rear side of the pawl 482, causing the helical spring 484 to compress. The pawl 482 then disengages from the teeth of the ratchet 480, allowing the ratchet 480 to freely rotate in the counterclockwise direction. Removing this force from the actuator button 170 causes the helical spring 484 to again seat the pawl 482 against a tooth of the ratchet 480, stopping any rotation in the counterclockwise direction.

During use of the gun cleaning system, the tether 120 passes through the aperture 402 of the housing 110. A spooled end portion 421 of the tether 120 is disposed inside of the housing 110 and coiled around the retraction spool 420. The second end 122 of the tether 120, which includes or is connected to the connection hoop 125, is disposed outside of the housing 110. Pulling the second end 122 of the tether 120 away from the housing 110 causes the retraction spool 420 and the ratchet 480 to rotate in the clockwise direction. The rotation of the retraction spool 420 causes the spiral spring 430 to rotatably compress and store rotational kinetic energy as potential energy. The pawl 482 allows the ratchet 480 to rotate in the clockwise direction but prevents rotation in the counterclockwise direction. When the user stops pulling on the first and 122, some of the potential energy stored in the spiral spring 430 releases to urge the retraction spool 420 and the ratchet 480 in the counterclockwise direction; however, the pawl 482 will engage a tooth of the ratchet 480 and prevent this rotation. Thus, the user can choose a desired length of the tether 120 to extend outside of the housing 110.

In some embodiments, the pawl 482 prevents rotation of the retraction spool 420 in both directions when the pawl 482 is seated against the teeth of the ratchet 480, thus acting as detent.

In some alternative examples, the pawl and ratchet mechanism can be omitted and another type of mechanism can be used. For example, the retractor assembly can be provided with a frictional brake to halt rotation of the retraction spool. And as mentioned above, other retraction mechanisms are suitable for application in the gun cleaning system described here.

Figure 5:
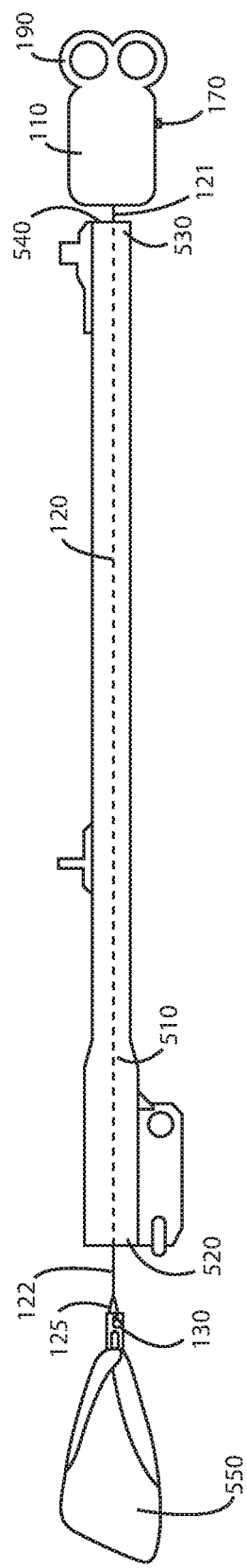
FIG. 5 is a schematic view of the gun cleaning system of FIG. 1.

FIG. 5 is a schematic view of the gun cleaning system of FIG. 1 in use. In the example of FIG. 5, the gun cleaning system 100 is used in a method for cleaning a gun barrel 510. As in FIG. 1, the gun cleaning system includes a housing 110 containing a retractor, a tether 120 having a first end 121 coupled to the retractor, and a connection hoop 125 at a second end 122 of the tether 120. A cleaning attachment 130 is coupled with the connection hoop 125. The gun barrel 510 has a bore with a muzzle 530, a breach 520, and a crown 540.

Initially, the tether 120 will be retracted inside of the housing 110. The method for cleaning the gun barrel 510 includes pulling the tether 120 out of the housing 110, causing a retractor spring inside of the housing 110 to store kinetic energy as potential energy as the tether 120 uncoils from a retractor spool inside of the housing 110. The connection hoop 125 is then inserted into the muzzle 530. The connection hoop 125 and the tether 120 are threaded through the bore of the gun barrel 510 to exit the breach 520 of the gun barrel 510. After this step, the connection hoop 125 is inserted into the opening 342 of the cleaning attachment 130 and into the recess 140. A catch 352 prevents the connection hoop 125 from exiting the recess 140. Before or after this step, a patch cloth 550 can be inserted into the aperture 350 of the cleaning attachment 130. Then the tether 120 and the cleaning attachment 130, which is now coupled to the tether 120, are both pulled back through the bore of the gun barrel 510 starting from the breach 520 to exit the muzzle 530 of the gun barrel 510.

In some examples, a user manually pulls on the tether 120 to pull the cleaning attachment 130 through the bore of the gun barrel 510. The retractor button 170 can then be pushed to actuate the retractor inside of the housing 110 to retract the tether 120 into the housing 110. In alternative examples, instead of manually pulling on the tether 120, a user can hold the one or more handles 190 and press the retractor button 170. This actuates the retractor inside of the housing 110. The retractor then causes the tether 120 to be retracted into the housing 110, which causes the cleaning attachment 130 to be pulled through the bore of the gun barrel 510.

The method described herein reduces the chance of damage to the crown 540 of the gun barrel 510 because the tether 120 and the connector hoop 125 are constructed of materials that will not scratch or otherwise harm the crown 540. The stiffness of the tether 120 allows it to be easily threaded through the bore of the gun barrel 510.

In some particular instances, a user may wish to clean the barrel of the gun by pulling the cleaning attachment 130 from the muzzle 530 of the gun barrel 510 to exit the breach 520. This is also possible with the gun cleaning system 100. The connector hoop 125 would simply be inserted into the breach 520 and threaded through the bore of the gun barrel 510 to exit the muzzle 530. The cleaning attachment 130 can then be coupled to the connector hoop 125, and the cleaning attachment 130 with a cleaning patch 550 (or cleaning cloth) can be pulled starting from the muzzle 530 end to exit the breach 520.

Figure 6:
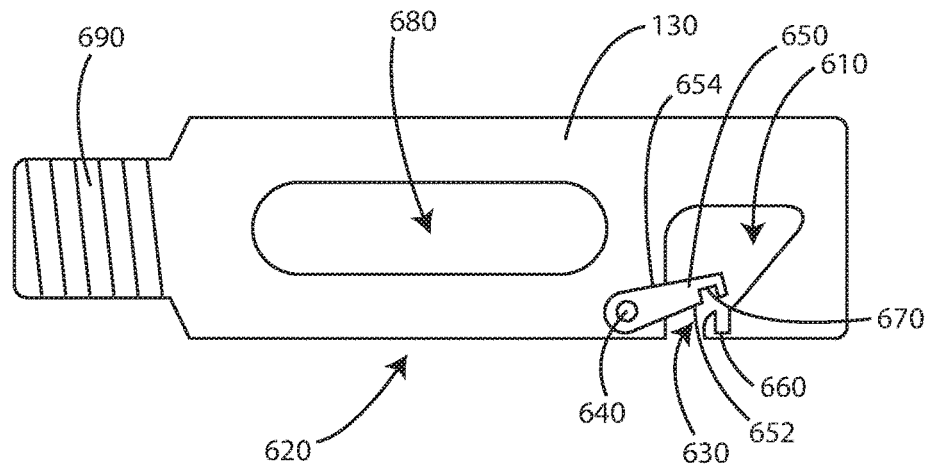
FIG. 6 is a schematic view of an alternative example of a cleaning attachment.

FIG. 6 shows a cleaning attachment including an alternative example of a catch according to some embodiments herein. A cleaning attachment 130 has an opening 630 in a side 620 of the cleaning attachment 130 that provides access to a recess 610. The cleaning attachment 130 can also include an elongated aperture 680 configured to receive a cloth patch, and a threaded end 690. In the example of FIG. 6, the threaded end 690 is a male threaded end, however in many embodiments it can be a female threaded end.

A catch adjacent to the opening 630 is configured to prevent the connection hoop 125 from exiting the recess 140. Again in this example, the catch functions to prevent the connection hoop from exiting the opening of the cleaning attachment. In this case, the catch comprises a spring-loaded arm 650. The catch of FIG. 6 can operate similar to a carabiner, such as the carabiner shown and described in U.S. Pat. No. 5,005,266, the entirety of which is herein incorporated by reference. The spring-loaded arm 650 rotates around an axis 640. A notch 660 is provided adjacent to the opening 630.

The arm 650 includes a locking member 670, which may be a pin or recess that engages the notch 660. The spring in the axis 640 causes the arm 650 to be in a normally closed position in which the locking member 670 engages the notch 660. When the arm 650 is in the normally closed position, the arm 650 blocks the opening 630. Force applied to the arm 650 on an outside edge 652 of the arm 650 will cause the arm 650 pivot around the axis 640 and expose the opening 630, providing access to the recess 610. FIG. 6 shows the arm 650 pivoting when such a force is applied. When this force is removed, however, the arm 650 swings back to its normally closed position. Applying force to the inside edge 654 of the arm 650, however, does not cause any pivoting motion. This is because the notch 660 and the locking member 670 prevent the arm 650 from swinging outside of the opening 630.

In some examples, a user must manually apply force to the outside edge 652 of the arm 650, for example with a finger, to open the arm 650 and expose the opening 630. In alternative examples, the stiffness of the connection hoop 125 allows a user to grasp the tether 120 at the base of the connection hoop 125 or at the ferrule 250 and use the edge of the connection hoop 125 to apply force to the outside edge 652 of the arm 650 and cause the arm 650 to pivot into an open position.

Other implementations of a catch are possible. For example, the catch can be a latch that swings or slides across the opening and is secured by a pin. Other catch constructions configured to prevent the connection hoop 125 from exiting the recess 140 are possible, and are within the scope of the current technology.

Figure 7:
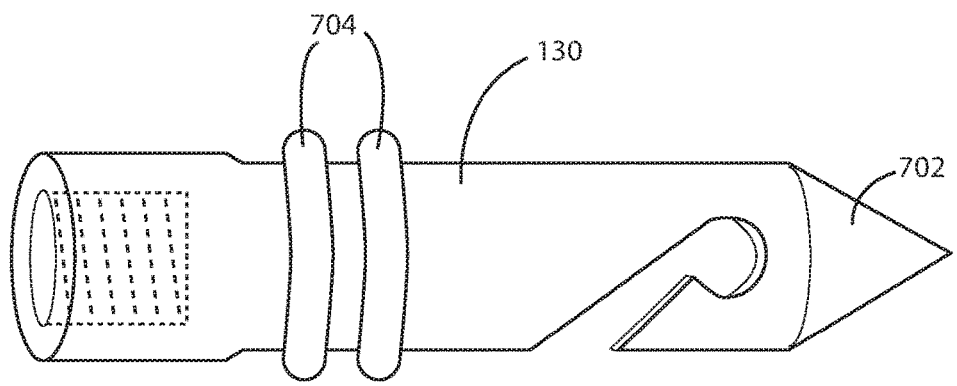
FIG. 7 is a schematic view of an alternative example of a cleaning attachment.

FIG. 7 shows a cleaning attachment 130 in accordance with various other embodiments herein. In this example, the cleaning attachment 130 includes a pointed end 702 (which may be conical, pyramidal, or another shape including a point). The cleaning attachment 130 lacks an opening to receive a cloth patch. Rather, the cloth patch can be pulled over the pointed end 702 and slid over the cleaning attachment 130 coming to rest just ahead of one or more retaining flanges 704 or rings. The cloth patch can be positioned before the cleaning attachment 130 is attached to the tether.

Tether Aspects

Various embodiments herein include a tether. The tether can be a rope, a cord, a thread, a wire, a string, twine, or other similar thin, elongated construction. There are a number of techniques that can be suitable for manufacturing the tether, such as braiding, twisting, extruding, or rolling. In some embodiments, the tether can be formed from a monofilament material. In other embodiments, the tether can be formed from a material that contains multiple fibers and is spun, braided, woven, or the like. For example, in some embodiments, the tether can be formed of a braided polymeric material (such as NYLON and/or SPECTRA).

During use, the tether is fed into a barrel of a gun. The physical properties of the tether must be such that the tether can be inserted and pushed through the barrel easily. The tether must also be able to coil around a retractor spool inside of a housing. Therefore, in some examples, the tether is sufficiently stiff to hold its shape when being pushed into a gun barrel, while still being sufficiently flexible to be wound onto a retractor spool. The bending stiffness of a material depends upon its modulus of elasticity and moment of inertia of the material.

In some embodiments the tether can exhibit a tensile strength 50, 75, 100, 125, 150, 200, 300, or 400 pounds. In some embodiments the tensile strength can fall within a range wherein any of the foregoing tensile strengths can serve as the upper or lower bound of the range.

In some embodiments, the tether can be formed of a material exhibiting an elongation at break of 1%, 3%, 5%, 7%, 9%, 11%, 13%, 15%, or 17%. In some embodiments, the elongation at break can fall within a range wherein any of the foregoing values for elongation at break can serve as the upper or lower bound of the range.

In some embodiments, the tether can have a diameter that is similar to or the same as the diameter of the material forming the connection loop. In some embodiments, the tether can have a diameter of 0.025", 0.035", 0.05", 0.075", 0.1" or more. In some embodiments the diameter of the tether can fall within a range wherein any of the foregoing diameters can serve as the upper or lower bound of the range.

Another consideration in the physical properties for the tether is that scratches or dents in the muzzle can degrade the shooting accuracy of the gun. Therefore, care must be taken to choose a material that will not scratch the interior surface of the gun barrel, nor the crown of the muzzle. The tether can be constructed from a number of suitable materials. In some examples, the tether can be made of natural fiber, synthetic polymer, a plastic-coated metal, or other suitable materials. For example, the tether can be a NYLON line with a KEVLAR core material.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this specification pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein. As such, the embodiments described herein are not intended to be exhaustive or to limit the scope to the precise forms disclosed herein. Rather, the embodiments are chosen and described so that others skilled in the art can appreciate and understand the principles and practices.

The claims are:

1. A gun cleaning system comprising:
a housing defining an aperture and an interior volume;
a retractor disposed in the interior volume of the housing;
a tether passing through the aperture of the housing, the tether comprising
a first end connected to the retractor,
a second end opposite the first end, and
a connection hoop connected to the second end of the tether; and
a cleaning attachment configured to be detachably connected to the connection hoop, the cleaning attachment comprising
a coupling recess,
an opening providing access to the coupling recess,
a first catch adjacent to the opening, and
an aperture configured to receive a cleaning patch;
wherein the opening of the cleaning attachment is configured to receive the connection hoop into the coupling recess, and
wherein the first catch is configured to prevent the connection hoop from exiting the coupling recess.

2. The gun cleaning system of claim 1, wherein the retractor is configured to retract the tether through the aperture and into the housing.

3. The gun cleaning system of claim 1, further comprising at least one handle attached to the housing.

4. The gun cleaning system of claim 1, wherein the retractor comprises a spring-loaded retraction spool configured to retract the tether into the housing.

5. The gun cleaning system of claim 1, further comprising an actuator configured to activate the retractor to retract the tether into the housing.

6. The gun cleaning system of claim 1, wherein the tether further comprises a ferrule at a base of the connection hoop.

7. The gun cleaning system of claim 1, wherein the coupling recess of the cleaning attachment further comprises a corner configured to seat the tether in the coupling recess.

8. The gun cleaning system of claim 1, the cleaning attachment further comprising a threaded end.

9. The gun cleaning system of claim 1, wherein the cleaning attachment has an elongated body and the opening of the cleaning attachment is situated on a side of the elongated body.

10. The gun cleaning system of claim 1, further comprising a second catch adjacent to the opening opposite from the first catch.

11. The gun cleaning system of claim 1, wherein the first catch comprises at least one of a normally closed spring-loaded arm, a constriction, and a latch.

12. A method for cleaning a gun barrel, the method comprising:
pulling a tether out from a housing, the housing defining an aperture and an interior volume;
the tether passing through the aperture of the housing, the tether comprising
a first end connected to a retractor disposed within the interior volume,
a second end opposite the first end, and
a connection hoop disposed at the second end of the tether;
inserting the connection hoop into a muzzle of the gun barrel;
passing the connection hoop through the gun barrel to exit a chamber of the gun barrel;
inserting the connection hoop into an opening of a cleaning attachment, the cleaning attachment comprising
a coupling recess,
the opening providing access to the coupling recess,
a catch adjacent to the opening, and
an aperture configured to receive a cleaning patch; and
pulling the tether and the cleaning attachment through the gun barrel to exit the muzzle of the gun barrel.

13. The method for cleaning a gun barrel of claim 12, further comprising:
retracting the tether into the aperture of the housing by activating the retractor.

14. The method for cleaning a gun barrel of claim 12, wherein the step of pulling the tether and the cleaning attachment through the gun barrel to exit the muzzle of the gun barrel comprises retracting the tether into the aperture of the housing by activating the retractor.

15. A gun cleaning system comprising:
a housing having a retractor;
a cleaning attachment comprising a coupling recess; and
a tether having
a first end coupled to the retractor, and
a connection hoop at a second end of the tether opposite the first end, the connection hoop configured to releasably couple with the coupling recess;
wherein the cleaning attachment further comprises an opening providing access to the coupling recess and a catch adjacent to the opening, the catch configured to prevent the connection hoop from exiting the coupling recess.

16. The gun cleaning system of claim 14, wherein the catch comprises at least one of a lip, a bump, and a protrusion.

17. The gun cleaning system of claim 14, wherein the catch comprises at least one of a normally closed spring-loaded arm, a constriction, and a latch.

18. The gun cleaning system of claim 14, wherein the housing further comprises an aperture situated at a midpoint of the housing, the tether being disposed in the aperture.

19. The gun cleaning system of claim 18, wherein the housing further comprises at least one handle situated opposite the aperture of the housing.

* * * * *